United States Patent [19]

Dunn et al.

[11] Patent Number: 5,392,192

[45] Date of Patent: Feb. 21, 1995

[54] METHODS AND APPARATUS FOR SNAP-TOGETHER COMPUTER CONSTRUCTION

[75] Inventors: C. Lorenzo Dunn, Los Gatos; John E. Johnston, San Francisco; David H. Titzler, San Jose; Robert A. Yuan, Belmont, all of Calif.

[73] Assignee: Apple Computer, Inc., Cupertino, Calif.

[21] Appl. No.: 35,007

[22] Filed: Mar. 22, 1993

[51] Int. Cl.⁶ .................. H05K 7/14; H05K 9/00; H01R 13/648

[52] U.S. Cl. .................. 361/683; 361/727; 361/818; 174/35 R; 174/35 GC; 29/469; 29/830

[58] Field of Search .............. 312/223.1, 223.2, 204, 312/263, 265, 265.1, 265.6, 257.1, 348.3, 348.4; 200/330, 331; 174/35 R, 35 GC; 361/679, 829, 683–686, 831, 724–727, 816, 818, 832; 364/708.1; 29/467, 469, 830–832; 439/607, 609

[56] References Cited

U.S. PATENT DOCUMENTS

| | | | |
|---|---|---|---|
| 4,229,921 | 10/1980 | Schell | 312/204 |
| 4,916,578 | 4/1990 | Mast | 361/818 |
| 5,164,886 | 11/1992 | Chang | 361/724 X |
| 5,224,024 | 6/1993 | Tu et al. | 361/831 |
| 5,317,105 | 5/1994 | Weber | 174/35 GC |

OTHER PUBLICATIONS

IBM Technical Disclosure Bulletin, vol. 30, No. 6, Nov., 1987, pp. 18 and 19, "Connector Shield/Bracket To Provide Electromagnetic Compatability", copy in 174–35 R.

*Primary Examiner*—Michael W. Phillips

*Attorney, Agent, or Firm*—Jeffrey J. Brooks

[57] ABSTRACT

A modular enclosure for personal computer systems substantially comprises a 5-sided steel chassis, a plastic subassembly tray, a plastic detachable back panel, and a 4-sided plastic top cover including an integrally formed front panel. The internal subassembly tray comprises appropriately formed bays designed to receive various system subassemblies, each bay having an integrally formed subassembly retaining means to bear against and retain a subassembly placed in the bay. Top side and rear electromagnetic interference (EMI) shields are fitted and secured to the interior portions of the plastic topcover and rear panel so as to peripherally contact the chassis when the topcover and rear panel are installed. The internal subassembly tray is lowered into the interior region of the chassis and snapped into place at the front portion thereof. The rear panel is then positioned and secured to the chassis. A plurality of subassemblies, including disk drives and main circuit board may be secured in the subassembly tray and chassis, and interconnected via an appropriately sized subassembly and main cable bundles. Front EMI shields are snapped in place onto the chassis. Tab members disposed in the lower front edge of the topcover assembly are positioned into tab-receiving slots in the lower front edge of the chassis. The topcover assembly is rotated downward until the top side EMI shield contacts the top rim of the steel chassis, and thereafter secured onto the base assembly by engaging large cover-mounting snaps, formed in the top cover, into complimentary hooks formed in the rear panel secured to the rear portion of the chassis-tray assembly. Line power to a power supply is switchably engaged by a frontally disposed button on the topcover assembly through an actuator to an internal power supply switch.

18 Claims, 7 Drawing Sheets

METHODS AND APPARATUS FOR SNAP-TOGETHER COMPUTER CONSTRUCTION

BACKGROUND OF THE INVENTION

1. Field of the Invention

The present invention relates generally to computer enclosure construction designs and methods. More particularly, the present invention relates to a personal computer enclosure designed to be assembled and to receive modular subassembly components substantially with minimal fasteners or other assembly hardware.

2. Art Background

Computer systems typically comprise numerous electronic and mechanical components and subsystems coupled together to function as a unit. For example, a common arrangement of component subparts forming a personal computer system might include a central processor unit (CPU), memory devices, and input and output (I/O) controllers coupled to a main processor board, with other peripheral devices (e.g., floppy, hard, or optical mass storage drives) and functional subassemblies (e.g., power supplies) mounted elsewhere within a housing or enclosure. The various peripheral and functional subassemblies of the personal computer are connected to each other by wiring or other communications pathways.

In the prior art, a computer enclosure typically may comprise a substantially rectangular metal housing having threaded through-holes or spot-welded brackets and standoffs positioned to receive the above subassemblies. The subassemblies typically are installed into computer enclosures using straightforward mounting methods and hardware, including screws, clamps, rivets, brackets, and other fixtures requiring use of hand or machine tools. Occasionally the mechanical strength of an enclosure is enhanced by providing an internal metal chassis to receive and support the subassemblies, wherein the chassis is enclosed within a plastic shell mounted over the chassis to provide attractive appearance and finish. In such a case, subassemblies must be fastened onto the metal chassis using the above hardware with hand or machine tools. Additionally, metal enclosures may entail higher material costs and greater weight than comparable plastic parts.

Especially in the rapidly evolving field of personal computers, modularity and interchangeability of system subassemblies is important to manufacturers, retailers, and users alike. In the case of a manufacturer, modularity is important because the manufacturer can more easily and cost effectively adapt finished goods to customer demands and technology changes without substantially redesigning or rebuilding existing such products. Moreover, products can be more easily built at a central manufacturing site, and later customized for localized domestic or foreign use. Alternatively, a retailer can more easily update stocked but unsold computer systems as more powerful subassemblies become available, or to upgrade and service customers' computer systems. Customers benefit from modular system designs because they initially can purchase a base system which meets their present needs, and later expand their systems' performance and storage functions by replacing components to achieve higher performance. For example, a customer may wish to replace his existing processor board with a more powerful processor board, or to replace an existing disk drive with a higher capacity mass storage device, but without incurring significant dealer service costs in performing the upgrade.

Prior art computer system designs have included some modularity in that processor boards and mass storage devices could be removed and replaced. However, such replacement typically requires that many of the subassemblies, especially those mounted near the top of the computer enclosure, be removed to gain access to the lower mounted subassemblies. As a result, a substantial portion of a typical prior art computer system must be disassembled to install a new subassembly. Similarly, a manufacturer seeking to reconfigure an existing product design to support additional rear panel connectivity may have to provide an entirely newly design enclosure because the original enclosure integrally incorporates the rear panel connector openings. For a manufacturer seeking to upgrade finished goods with a newly available product, such disassembly and reassembly can substantially increase labor costs, and therefore the final cost of the computer system.

As will be described in the following detailed description, the present invention overcomes many of the problems associated with prior art personal computer system enclosures by providing a lightweight, simple to manufacture yet robust, design comprising essentially four parts which can be substantially snapped together, and which uses only minimal traditional hardware. The enclosure is designed to receive all functional components and subassemblies necessary to the operation of a personal computer system without limiting access to any other subassembly. Moreover, certain cosmetic exterior panels may be removed and replaced. As a result, a personal computer system designed and assembled in accordance with the present invention can be readily and inexpensively reconfigured or updated by the manufacturer, retailer, or end user without need for time consuming or costly disassembly and assembly operations.

SUMMARY OF THE INVENTION

A modular enclosure for personal computer systems, and methods for assembly of an enclosure, are disclosed. In one embodiment, the enclosure substantially comprises a steel chassis, a plastic subassembly tray, a plastic detachable back panel, and a 4-sided detachable plastic top cover including an integrally formed front panel. The chassis comprises a 5-sided steel pan having an open interior region the steel pan functioning as a base electromagnetic interference (EMI) shield to help minimize EMI emitted from the enclosure. The internal subassembly tray comprises appropriately formed bays designed to receive various system subassemblies, such as floppy disk drives, hard disk drives, and the like, each bay having an integrally formed subassembly retaining means to bear against and retain such subassembly placed in the bay.

The internal subassembly tray is mounted into the interior region of the chassis via a plurality of tray-mounting snaps and tabs located on front, side, and bottom portions of the tray being received by complimentary snap-receiving and tab-receiving openings in the chassis, respectively. The rear panel is then fitted with a rear EMI shield, and thereafter positioned and secured to the chassis by a plurality of panel-mounting snaps and hooks being received by complimentary panel-mounting openings in the chassis.

A plurality of subassemblies, including disk drives and optical disk drives, are then mounted into the respective bays of the subassembly tray and secured via the integrally formed subassembly retaining means. A power supply, a main processor printed circuit board, and other functional subassemblies are also installed into the chassis as necessary. Electrical connections for subassemblies installed in the tray are substantially established by routing an appropriately sized subassembly cable bundle disposed in the tray between the subassemblies, and connecting the subassembly cable bundle to a main cable bundle via a plurality of connectors. Additional wiring needs can be accommodated by providing and routing one or more secondary cable bundles between particular subassemblies.

One or more U-shaped front EMI shields are then mounted to the front side of the chassis so as to cover the subassemblies installed in the subassembly tray. A top EMI shield is then fitted and secured to the interior portion of the plastic topcover such that the top shield contacts the chassis when the topcover is installed. One or more plastic bezels is detachably mounted to the front panel portion of the top cover via a hook-and-snap means to permit subsequent updating and reconfiguration of the subassembly devices frontally mounted in the bays of the built up chassis-tray assembly. Each bezel may also be fitted with EMI shielding as necessary to mate to the front EMI shields mounted at the front portion of the steel chassis to effect a continuous EMI shield at the front and top portions of the computer system.

Thereafter, a plurality of tab members in the lower front edge of the top cover are positioned into tab-receiving slots in the lower front edge of the chassis, and the cover thereafter rotated downward until the plurality of tabbed fingers formed in the top EMI shield mounted to the top cover assembly contact the top rim of the steel chassis. The top cover assembly is finally securely onto the built up chassis-tray assembly by engaging large cover-mounting snaps, formed in the top cover, into complimentary hooks formed in the rear panel secured to the rear portion of the chassis-tray assembly, thereby completing the computer enclosure. A power supply actuator previously mounted to the chassis enables front panel on-off switching functionality without need for electrical switching components mounted to the removable topcover, thereby facilitating topcover removal and replacement.

BRIEF DESCRIPTION OF THE DRAWINGS

The present invention will be understood more fully from the detailed description given below and from the accompanying drawings of the preferred embodiment of the invention in which:

FIG. 1AA is an enlarged perspective view of a retaining hook forming part of the subassembly tray.

FIG. 3A illustrates a portion of the top cover assembly.

DETAILED DESCRIPTION OF THE INVENTION

The present invention discloses a modular computer enclosure for personal computer systems, and methods for assembly of such an enclosure. In the following description, for purposes of explanation, specific numbers, dimensions, and configurations are set forth in order to provide a thorough understanding of the present invention. However, it will be apparent to one skilled in the art that the present invention may be practiced without these specific details. In other instances, well known systems are shown in diagrammatic or block diagram form in order not to obscure the present invention unnecessarily.

Figure 1:
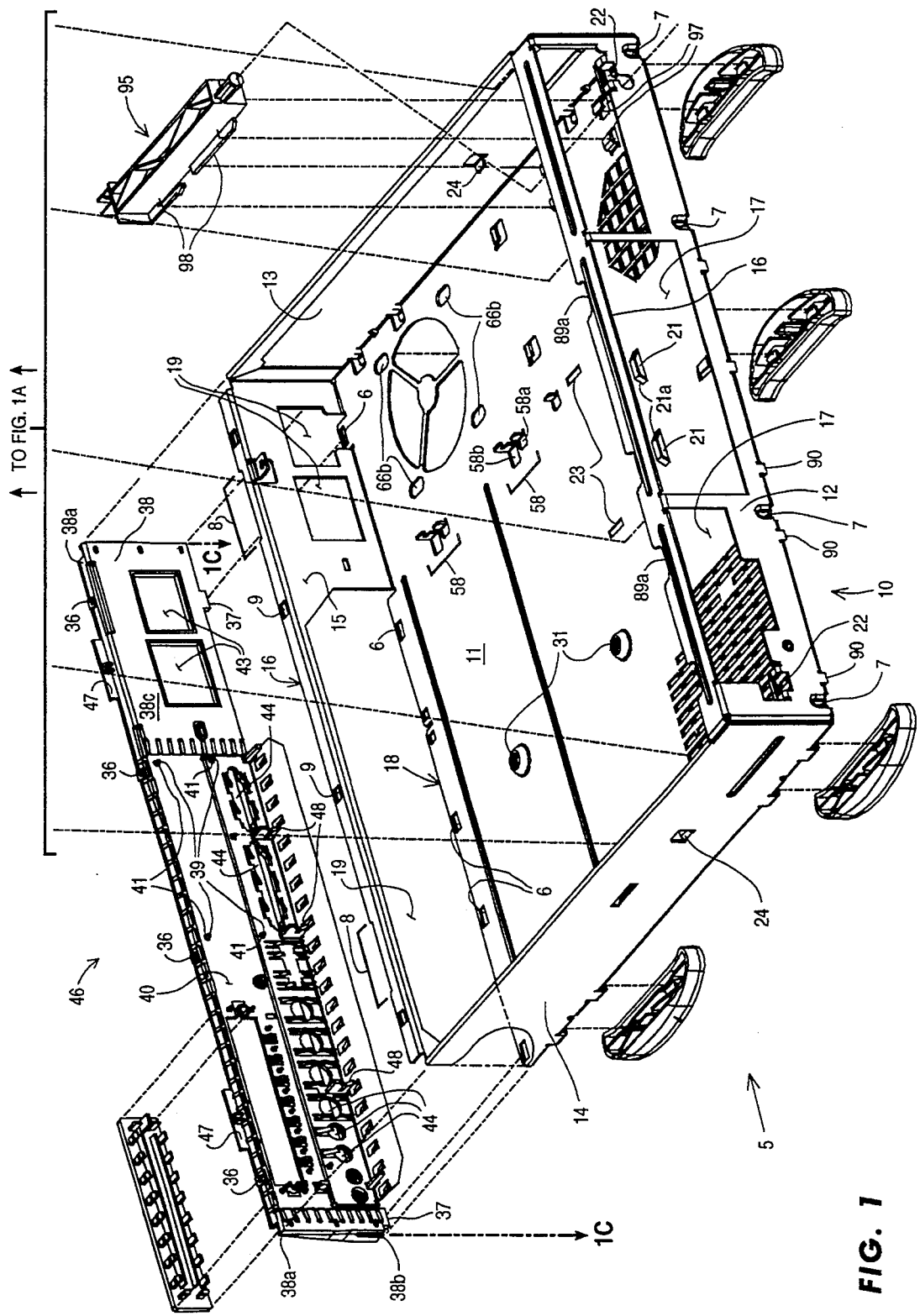
FIG. 1 is a perspective view of the formation of a base assembly of a personal computer enclosure, comprising a chassis, a subassembly tray, and a rear panel.

Reference is now made to FIG. 1, wherein is illustrated an exploded, perspective view of a base assembly 5 forming a portion of the computer enclosure of the present invention. Base assembly 5 substantially comprises a 5-sided open chassis 10, having a floor 11, a front side 12, a left side 13, a right side 14, and a rear side 15. A top rim 16 extends around upper edges of sides 12–15, and a bottom rim 18 extends around lower edges of sides 12–15. It is anticipated that, in accordance with the present invention, chassis 10 will comprise a stamped, drawn, or riveted metal manufacture, of appropriate strength to securely support the computer system, wherein floor 11 and sides 12–15 collectively serve as a base electromagnetic interference (EMI) shield for base assembly 5. Chassis 10 has a first plurality of tray hook-receiving openings 21 located on floor 11, and a plurality of tray snap-receiving openings 22 formed in front side 12. First plurality of hook openings 21 are formed by only partially punching through floor 11 so as to produce a perforated structure wherein the displaced metal remains attached at transverse edges, thus producing integral hook-retaining surfaces 21a (also shown partially in FIGS. 1B and 2) disposed within openings 21. Snap-receiving openings 22, in the present embodiment, are provided by appropriately forming one or more tab-shaped members in required locations on front side 12, and subsequently bending the tab-shaped member inwards, as shown in FIG. 1. Disposed in floor 11 are a plurality of tray tab-receiving openings 23 formed simply by either punching or broaching through floor 11. Moreover, one or more tray-retaining tabs 24 are formed in left and right sides 13 and 14, wherein tab members are formed and then subsequently bent into a 90° "L" shape inwards towards the interior of chassis 10. The purpose and function of openings 21, 22, and 23, and tabs 24 will be described in more detail in the following paragraphs.

Chassis 10 also has a number of front side openings 17 and rear side openings 19, through which a variety of subassembly and connector components (shown in FIG. 4) may be accessed for interconnection and servicing, etc. Further, in the portion of top rim 16 disposed on rear side 15 of chassis 10 is a plurality of panel-snap receiving openings 9 designed to receive and retain a plurality of rear panel mounting snaps 37 (discussed in more detail below). Chassis 10 also includes a second plurality of hook receiving openings 6 located in the portion of bottom rim 18 disposed on rear side 15, also described below. Snap-receiving openings 9 and hook-receiving openings 6 are formed by simple punching or broaching, as in the manner of openings 23 described above. A first plurality of board guide members 58 are formed in floor 11, wherein a first tab member 58a and a second tab member 58b formed in substantially the same manner as tray-retaining tabs 24 serve in combination to locate and secure a printed circuit board (50, FIG. 4) to chassis 10. Further, one or more threaded bosses 31 may be provided in floor 11 in a generally known manner to aid in securing the printed circuit board 50 to floor 11.

Figure 1A:
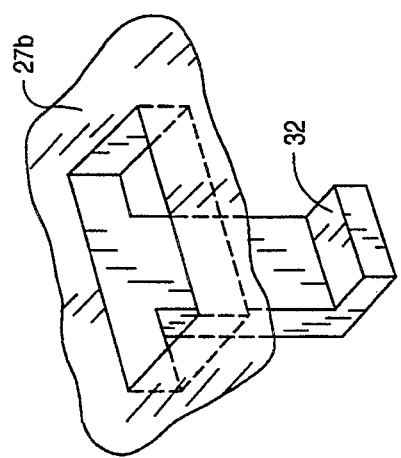
FIG. 1A is a perspective view of a subassembly tray.
Figure 1A:
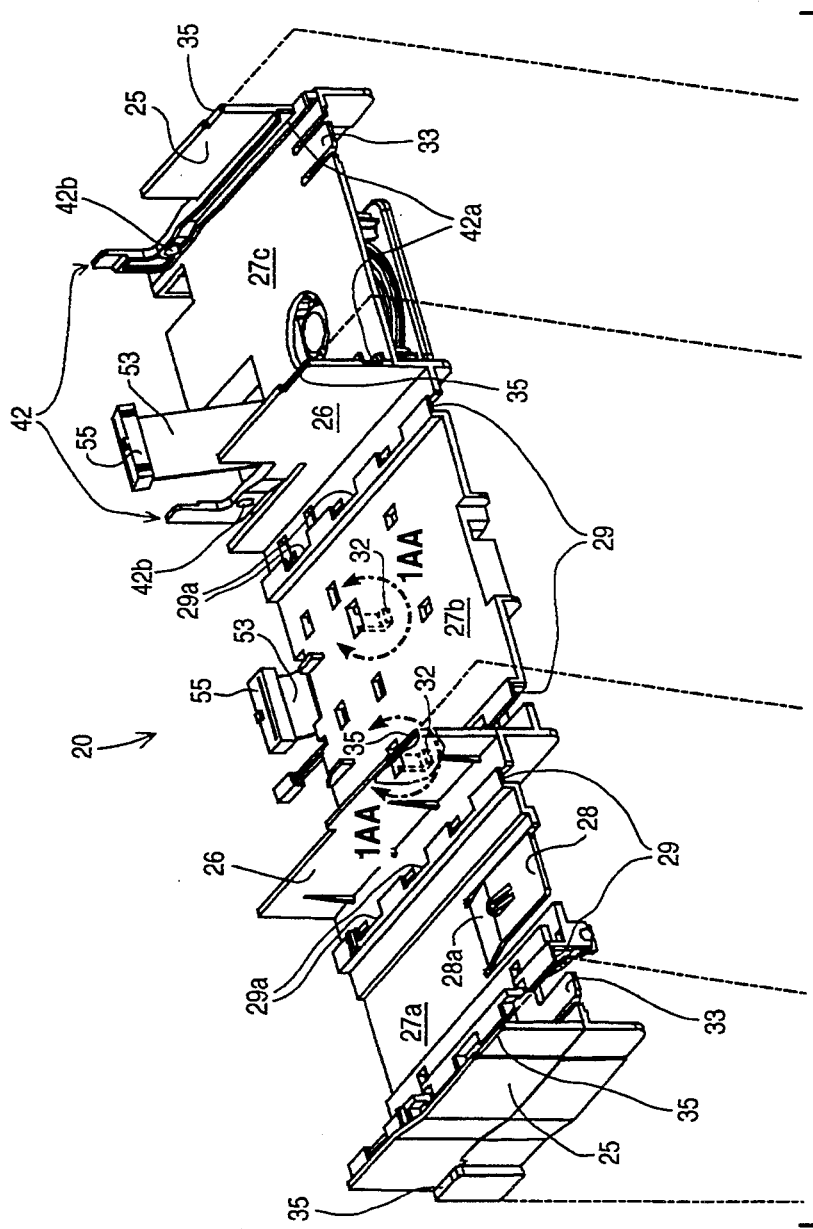

With reference to FIG. 1A, illustrated is a subassembly tray 20 comprising a number of integrally formed subassembly bays configured to include integrally formed subassembly retaining means. As presently preferred, tray 20 is a single, injection molded piece comprising three peripheral subassembly bays 27a, 27b, and 27c formed between a pair of laterally bounding sides 25 and a pair of orthogonally extending dividing walls 26. However, tray 20 could be dimensionally formed in any manner to receive any desired size and number of peripheral and functional subassemblies. Each of the subassembly bays 27a–c further includes as the subassembly retaining means one of two types of slide-and-lock systems. The first system comprises a pair of rails 29 having one or more notch regions 29a, as may be seen more clearly in FIG. 1B. Rails 29 receive a complimentarily formed carrier 62a (shown in FIG. 4) mounted to a subassembly 60 installed in the corresponding bay 27b, as suggested in FIG. 4. The second system comprises a pair of deflectable snap members 42 at terminal ends of a pair of rails 42a (FIG. 1A), each snap member 42 having a catch 42b designed to receive a complimentarily formed, alternative embodiment carrier 62b (shown in FIG. 4) mounted to another subassembly 60 when it is installed within the corresponding bay 27c, also as suggested in FIG. 4. Other retaining means are also feasible.

Figure 1B:
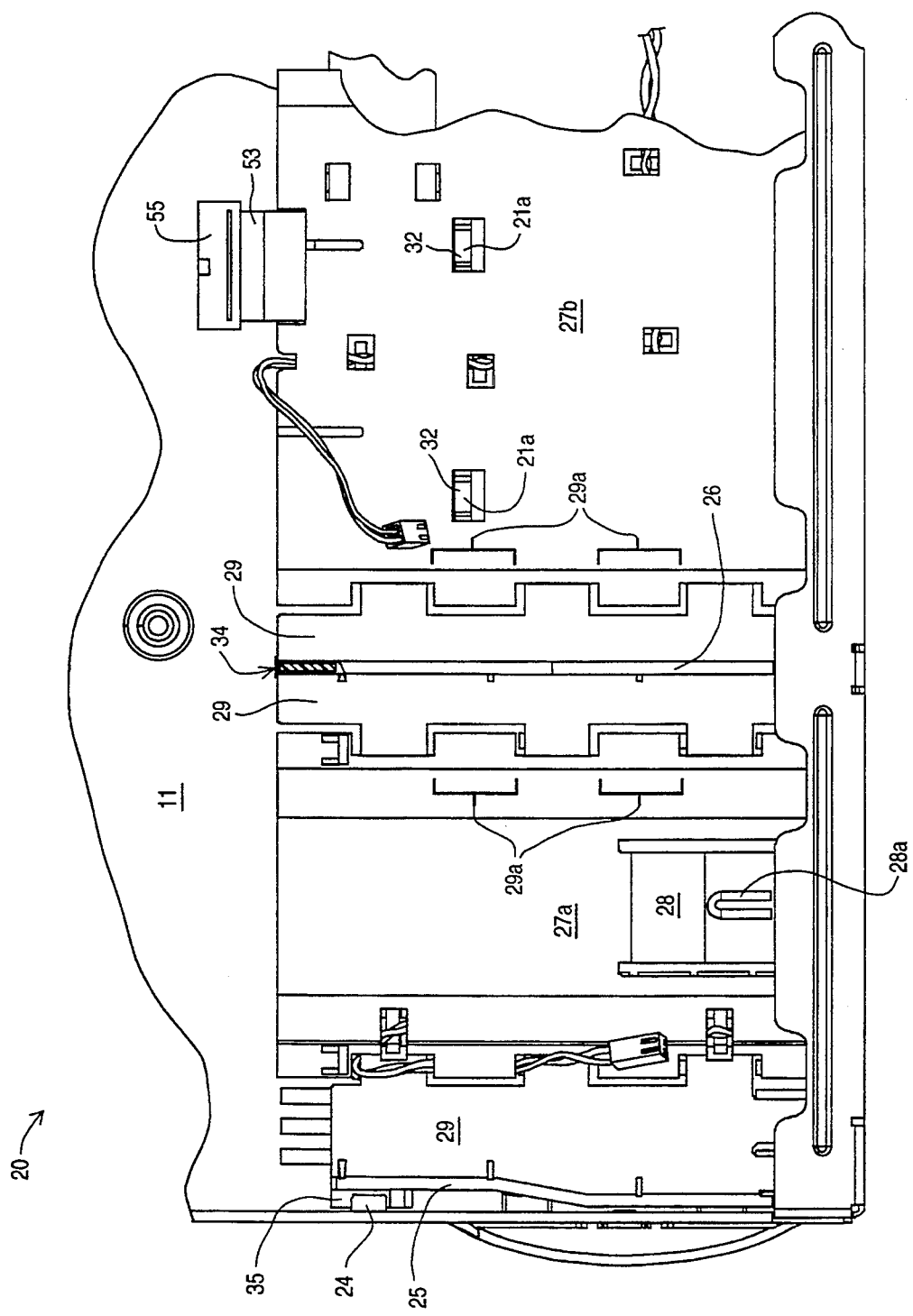
FIG. 1B is a plan view illustration of a portion of the subassembly tray shown in FIG. 1A.

As presently embodied and shown more clearly in FIG. 1A, subassembly bay 27a may further comprise a frontally located, deflectable snap 28 having a catch 28a designed to mate with a complimentary strap-retaining opening (not shown) in carrier 62a to further secure the subassembly installed within the corresponding bay 27a. In front and lower regions of subassembly tray 20 are formed a plurality of tray-mounting hooks 32, a plurality of tray-mounting snaps 33, and a plurality of tray-mounting tabs 34 (shown in FIGS. 2 and 1B). Snaps 33 are formed as generally known in the plastics-forming art, wherein a snap "head" is disposed at the distal end of a deflectable member, the head being initially displaced laterally and then engaged within a complementary opening, thus securing the head. Hooks 32 comprise a generally angulated head disposed upon a generally rigid member extending downward from a bottom surface of tray 20, which hook 32 is obliquely engaged without deflection into a complementary opening. Tabs 34 are flat, planar, members extending downward from rear portions of dividing walls 26 of tray 20 to locate tray 20 when mounting it into chassis 10, as described below. Further, front and rear portions of sides 25 and walls 26 define a plurality of tray-mounting surfaces 35 as shown in FIGS. 1A and 1B. The collective function of hooks 32, snaps 33, tabs 34, and surfaces 35 is to locate and secure subassembly tray 20 to chassis 10, wherein, for example, snaps 33 and tabs 34 will be respectively received by tray snap receiving openings 22 in front side 12 (best seen in FIG. 1) and tray tab receiving openings 23 in floor 11 (best seen in FIG. 2).

Provision for electrical connection to all functional subassemblies to be mounted within tray 20 is made by mounting an appropriately sized, prewired subassembly cable bundle 53 (FIGS. 1A and 1B) to subassembly tray 20. Subassembly cable bundle 53 will subsequently be coupled to the main printed circuit board (PCB) assembly 50 (FIG. 4) via a connector 55, and also will be routed to various subassemblies mounted within the subassembly bays 27 of tray 20. Subassembly cable bundle 53 may be formed in any manner and size appropriate to the wiring requirements of the computer system being constructed. For example, cable bundle 53 may provide power and signal connection for floppy and fixed-head disk drives, Small Computer Serial Interface (SCSI) devices, or other similar internal peripheral devices by providing appropriate connectors 55 at various points in cable bundle 53, as is generally known.

Having formed chassis 10 and tray 20 substantially as described above, tray 20 is first aligned above chassis 10 in conformance with all positioning and locking features (e.g., snaps 33 and snap-receiving openings 22), and then lowered down onto chassis 10 as suggested in FIG. 1, such that all positioning and locking features are mated and seated. In particular, tray-mounting snaps 33 at the front of tray 20 will seat within snap-receiving openings 22 in front side 12 of chassis 10, tray-mounting hooks 32 extending downward from underneath tray 20 will seat in hook-receiving openings 21 in floor 11, tray-mounting tabs 34 will be located within tab-receiving openings 23 disposed in floor 11, and surfaces 35 will bear against mounting tabs 24 located in sides 13 and 14, and by portions of upper rim 16 of front side 12.

Figure 1C:
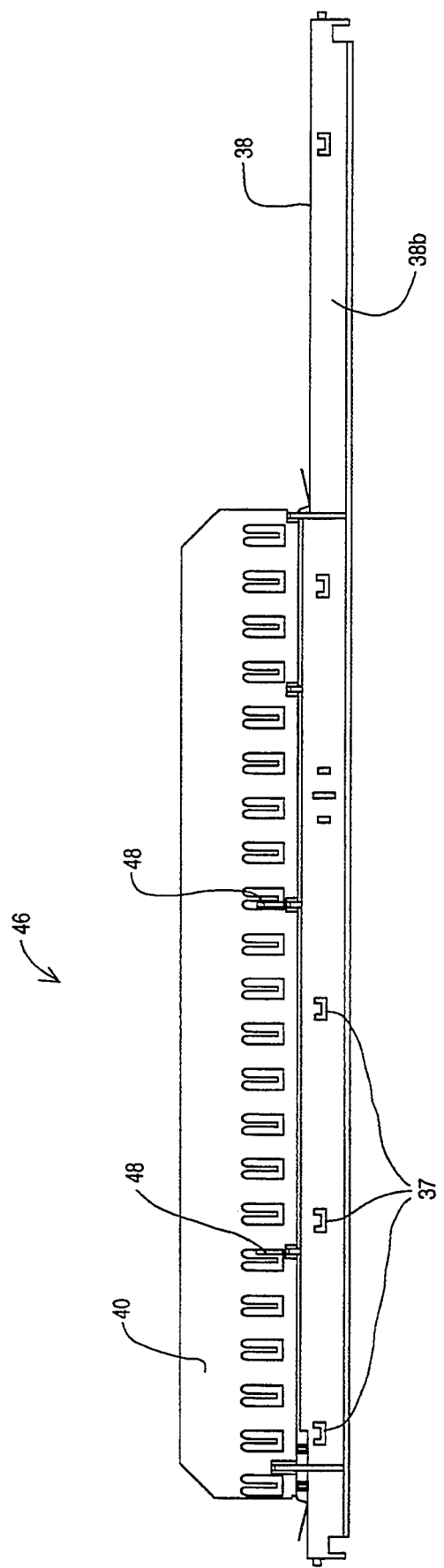
FIG. 1C is a bottom elevation view of the rear panel assembly.
Figure 2:
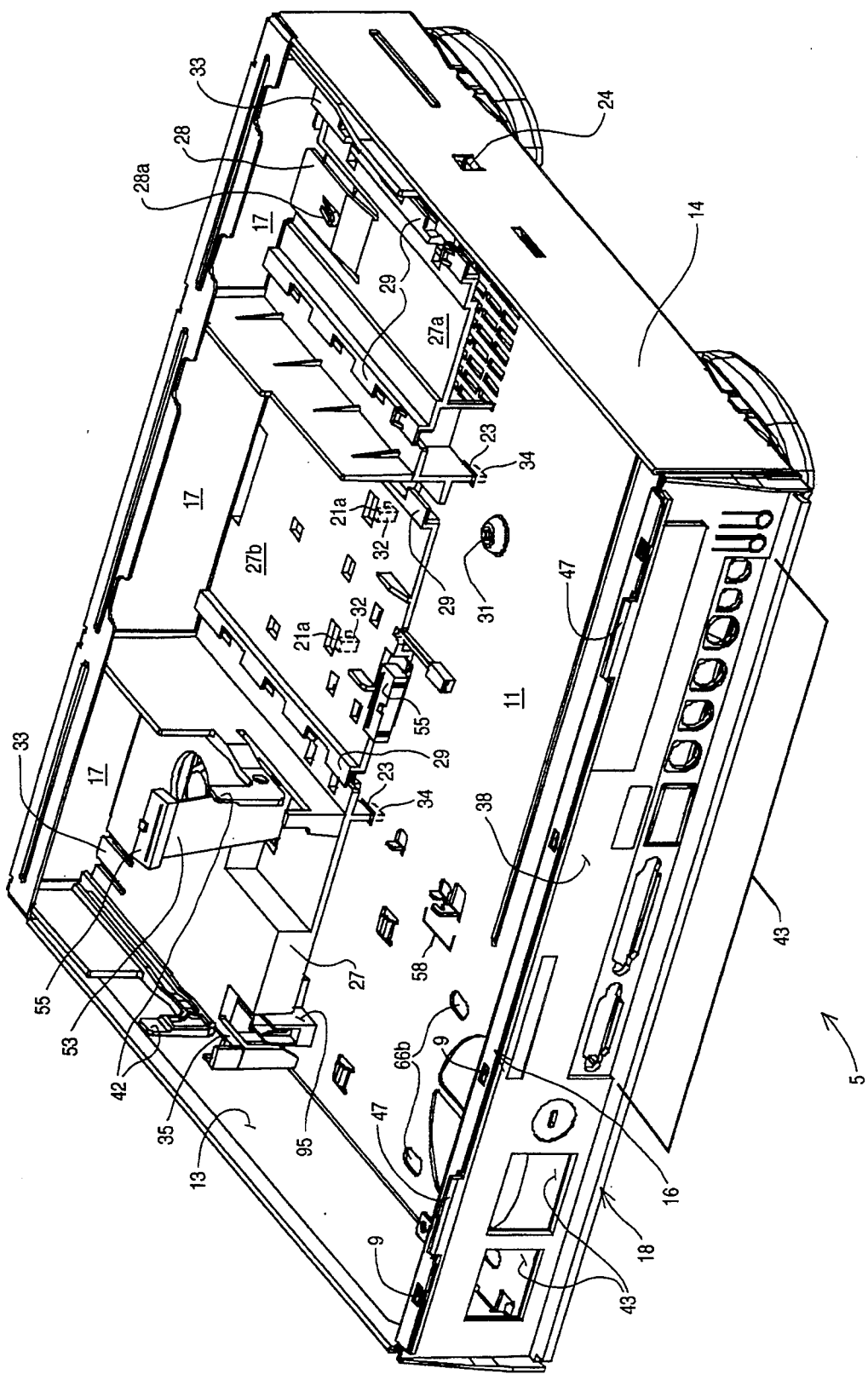
FIG. 2 is a reverse angle perspective view of the base assembly, wherein the subassembly tray and rear panel have been fitted to the chassis.

Referring to FIGS. 1, 1C, and 2, a rear panel 38 having a top edge 38a and a bottom edge 38b is illustrated as comprising a plurality of panel-mounting snaps 36 and panel-mounting hooks 37 (not shown in FIG. 2) disposed on top and bottom edges 38a and 38b, respectively. Snaps 36 and hooks 37 will be used to secure panel 38 to chassis 10 in substantially the same manner as securing tray 20 to chassis 10. In particular, panel-mounting hooks 37 are first positioned within panel hook openings 6 in the rear side portion of bottom rim 18 of chassis 10, whereafter rear panel 38 is rotated up and against rear side 15 of chassis 10 until panel-mounting snaps 36 are received into panel snap receiving openings 9 formed in the top rim 16 of rear side 15, thus securing panel 38 onto chassis 10. Rear panel 38 also has a plurality of connector access openings 43 arranged across panel 38 as necessary. As an integral feature of the present invention, it is specifically intended that panel 38 be easily detachable and/or interchangeable to facilitate new connector layout configurations for panel 38 when new connector arrangements become desirable or necessary (e.g., when upgrading the computer system). As shown in FIG. 1, rear panel 38 further comprises a plurality of topcover-retaining hooks 47 disposed in top edge 38a, as well as a plurality of board guides 48 generally located along bottom edge 38b, as shown. Board guides 48 substantially comprise grooved bosses extending perpendicularly from rear panel 38. Topcover-retaining hooks 47 are proportionally larger and longer than the previously discussed hook structures (e.g., tray mounting hooks 32), hooks 47 being intended to receive and lock an appropriately sized snap (81, in FIG. 3) to secure a large top cover assembly (78, in FIGS. 3 and 4).

Also shown in FIG. 1 is a rear panel assembly 46 consisting of a rear EMI shield 40 which is fitted to panel 38. Shield 40 comprises, among other features, a plurality of through-holes 41 corresponding in number and location to a plurality of pin members 39 disposed upon an interior surface 38c of rear panel 38. Rear EMI shield 40 further comprises a plurality of openings 44 corresponding substantially in number and size to openings 43 in rear panel 38 to permit insertion of connectors, etc. Rear panel EMI shield 40 is mounted to rear panel 38 such that board guides 48 extend freely through openings 44 allowing rear panel assembly 46 to flushly mount against rear side 15 of chassis 10. When shield 40 is maneuvered into position relative to rear panel 38, through-holes 41 of rear shield 40 receive pin members 39 on rear surface 38c of rear panel 38. Thereafter, pin members 39 are heat-staked in accordance with known plastics forming methods to form rivet-like structures to securely retain shield 40 against panel 38, thereby forming rear panel assembly 46. Alternative methods in lieu of through-holes 41 may be employed to attach shield 40 including, for example, a plurality of tanged openings (not shown) disposed in shield 40. In the alternative method, shield 40 would be positioned over panel 38 and pressed into place such that pin members 39 are received by the tanged openings, the tangs of openings bearing against and gripping pin members 39. As necessary, pieces of electrically conductive foam (not shown) may be appropriately employed to enhance EMI shielding qualities of rear panel assembly 46, as for example, between shield 40 and PCB connectors 51 on main circuit board 50, as best seen in FIG. 4.

With reference to FIGS. 1 and 1C, rear panel assembly 46 is then mounted to chassis 10 by obliquely positioning bottom edge 38b of panel 38 against chassis 10 such that panel-mounting hooks 37 (best seen in FIG. 1C) on panel 38 are inserted into and located by hook-receiving openings 6 in bottom rim 18. Thereafter, assembly 46 is rotated upward about a horizontal axis extending through hooks 37 until assembly 46 snugly bears against rearward facing surfaces of rear side 15 of chassis 10. In so doing, snaps 36 are received into snap-receiving openings 9 in top rim 16 of chassis 10. Once received within openings 9, gentle pressure is applied to assembly 46 in the direction of rotation until snaps 36 are positively engaged to retain assembly 46 on chassis 10. Thus assembled, base 10, tray 20, and rear panel assembly 46 together comprise base assembly 5, as illustrated in FIG. 2, to which may be now added a multiplicity of prior-assembled functional subassemblies 60, as will now be described.

Figure 4:
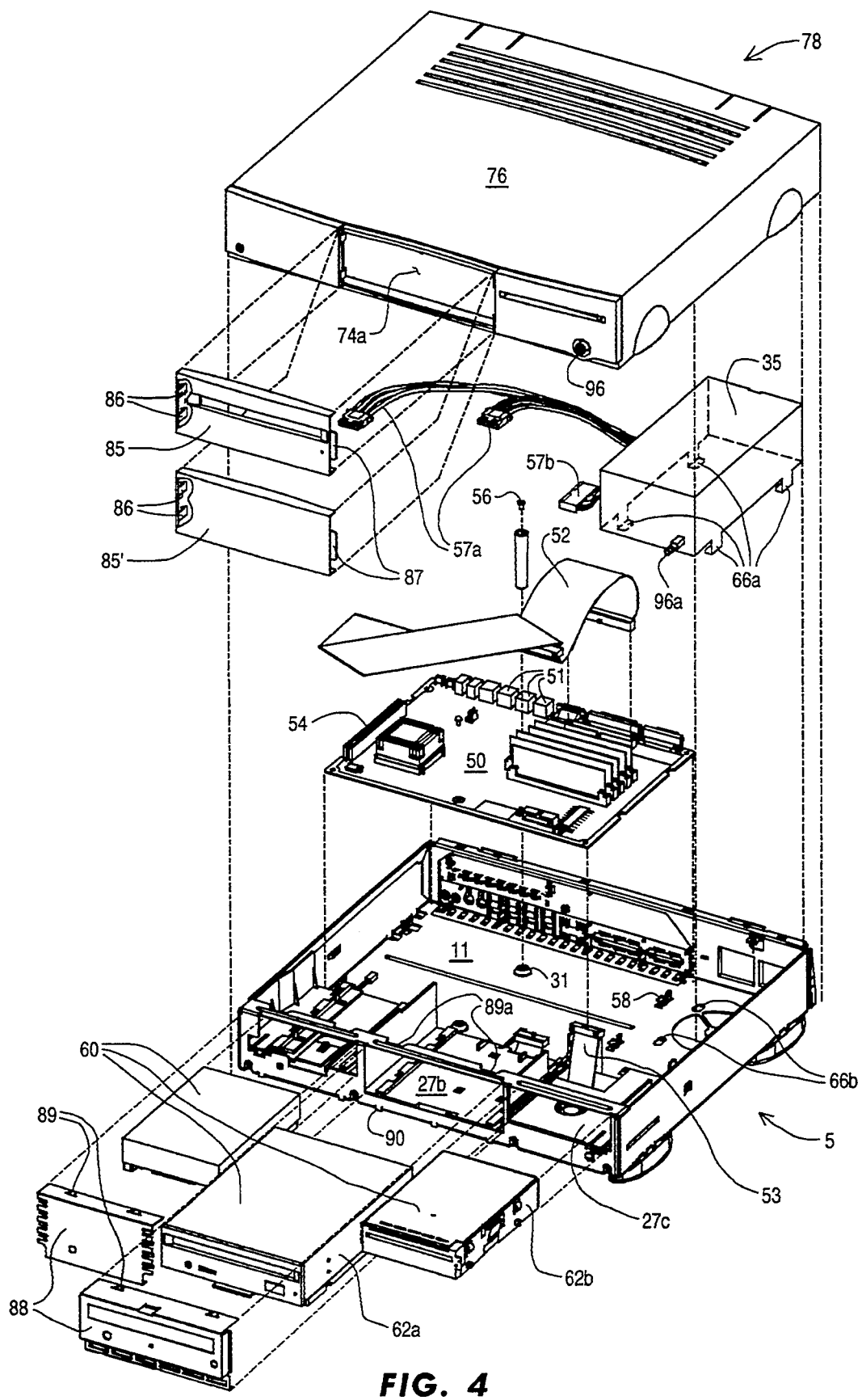
FIG. 4 illustrates the mounting of a main circuit board assembly, modular subassemblies, and main and secondary cable bundles within the base assembly, followed by installation of the top cover assembly including front bezels on the base assembly, completing the computer enclosure.

Reference is now made to FIG. 4, wherein an exploded view of the computer enclosure and principal subassemblies is shown. In FIG. 4, main circuit board 50 is lowered into base assembly 5 when assembly thereof is substantially complete. Main circuit board assembly 50 is positioned horizontally above floor 11 of base assembly 5, until assembly 50 is located by board guides 48 and 58 formed in rear panel assembly 46 and chassis 10 respectively. Board assembly 50 is then urged rearward towards rear panel 46 until assembly 50 is firmly seated within board guides 48 and 58. Main circuit board assembly 50 may then be secured to base assembly 5 by driving one or more threaded fastener 56 through board assembly 50 into threaded bosses 31 in floor 11. Thereafter, an assortment of internal peripheral subassemblies 60 may be inserted into the respective bays 27a–c, and rammed home, each subassembly thereby engaging the respective subassembly retaining means. As is generally known, peripheral subassemblies 60 may require prior mounting to a carrier 62a or 62b before being inserted in bays 27a–c. In general, carriers 62a or 62b should be designed to receive and engage whatever retaining means is provided in the respective bay, such as latch heads 28a of retaining snaps 28, rails 29 and notches 29a, or snaps 42 shown in FIG. 1A.

Further, a power supply module 35 having a plurality of L-shaped tabs 66a is inserted into base assembly 5 such that the L-shaped tabs 66a are received and secured within a corresponding plurality of reciprocally formed openings 66b, as shown in FIGS. 4 and 2. Thereafter, additional support structures may be snapped into place using, for example, the hook-and-snap scheme employed in connection with other subassemblies. A plurality of optional peripheral circuit boards (not shown) to be may be fitted as desired within base assembly 5. Facility and access to such optional peripheral circuit boards must be anticipated in any modern personal computer system, and appropriate combinations of hooks and flanges to attach support structures for such optional circuit boards may be formed in chassis base assembly 5, for example in the manner of tray hook-receiving openings 21 or tray tab-receiving openings 23 (FIG. 1). Next, electrical connections to all functional subassemblies 60 mounted within base assembly 5 are established by coupling connectors 55 of cable bundle 53 to subassemblies 60 and to main circuit board 50, as is generally known. Further, a main cable bundle 52 is coupled between a main connector block 54 on main circuit board 50 and remaining computer system components, such as power supply module 35, auxiliary memory cards, etc., as is also known. Additional wiring needs can be accommodated by providing and routing one or more secondary cable bundles between particular subassemblies, as for example direct power connection between subassemblies 60 and power supply module 35, as suggested by secondary cables 57a and 57b.

Figure 3:
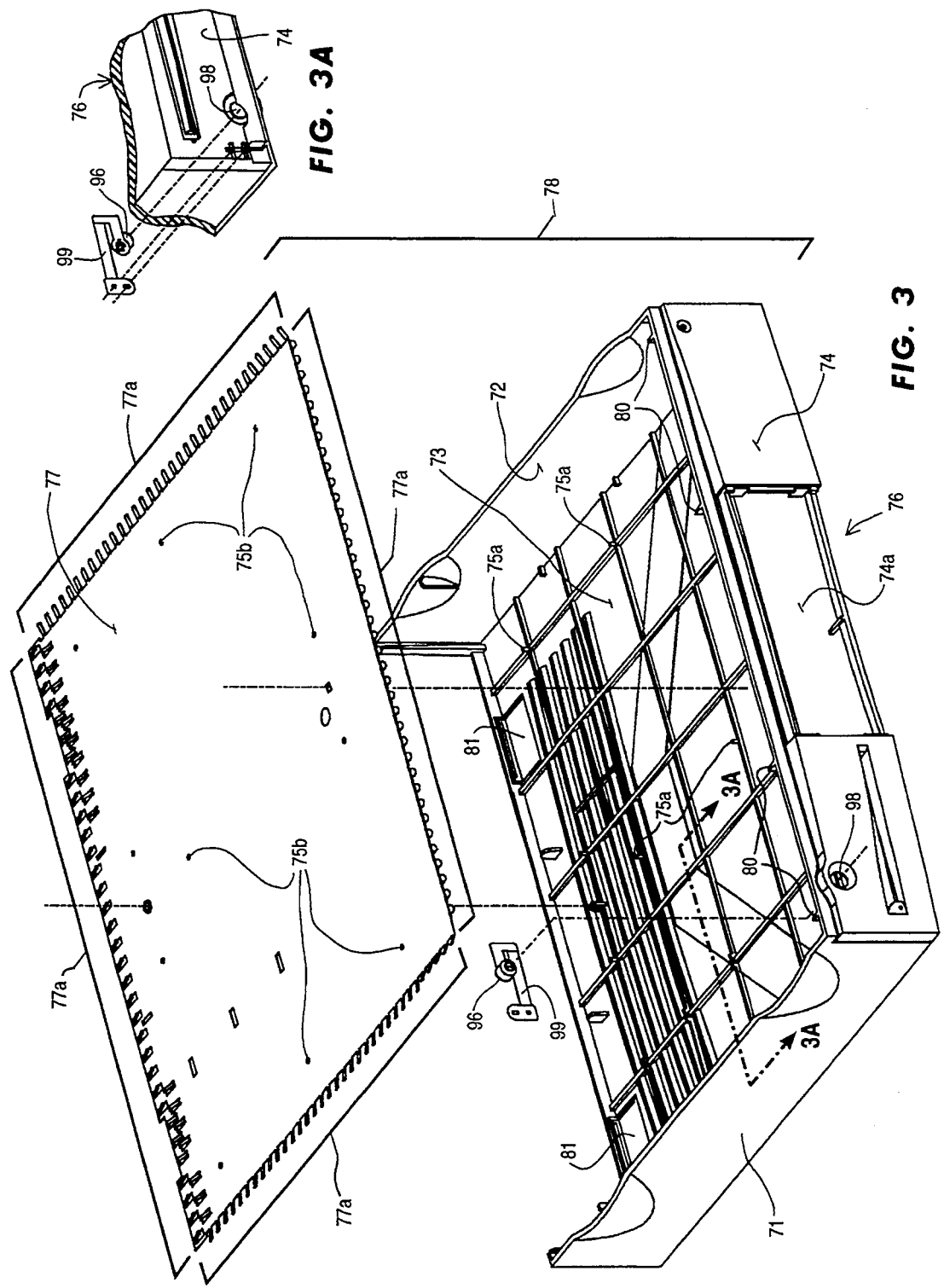
FIG. 3 illustrates the formation of a top cover assembly with integral front panel.

With reference to FIG. 3, assembly of a topcover assembly 78 will now be described. In FIG. 3, a lightweight plastic topcover 76 (shown in an inverted perspective position) is formed so as to substantially extend over and enclose 5-sided base assembly 5, topcover 76 having a right side 71, a left side 72, a top side 73, and a front side 74 having an expansion bay opening 74a formed therein. To preclude unwanted EMI emission from the computer system, topcover 76 is configured to receive a thin, metallic, top EMI shield 77 having a numerosity of elevated, tabbed fingers 77a located at peripheral edges of shield 77. Fingers 77a are intended to bear against top rim 16 of chassis 10 when topcover assembly 78 is mounted upon it. Shield 77 is subsequently secured to top side 73 using a system of pin members 75a located on topcover 76, and a corresponding number of through-holes 75b located on shield 77. Pins 75a and through-holes 75b are substantially similar to those employed in the rear panel assembly 46 shown in FIG. 4 above, wherein pins 75a are heatstaked after having received holes 75b in shield 77 to form rivet-like retaining members. Alternatively, topcover 76 and shield 77 together could comprise a plurality of upwardly extending posts intended to receive a corresponding plurality of self-clinching tanged openings (not shown) formed in top EMI shield 77. Topcover 76 also comprises a plurality of frontally disposed topcover-mounting tabs 80 and rearwardly disposed topcover-mounting snaps 81 as shown, which tabs 80 and snaps 81 will be used to secure topcover assembly 78 to base assembly 5 in substantially the same manner as securing rear panel assembly 46 to base assembly 5 described in FIG. 1 above.

Referring again to FIG. 4, shown are perspective views of alternative embodiments of a bezel 85 or 85' designed to conformally cover opening 74a in front side 74 of topcover 76. Bezel 85 permits removable mass storage media to be passed to a mass storage subassemblies installed in bay 27b (FIGS. 1, 2, and 4). For example, a purchaser or user of such a computer system may choose to install a high density compact disc (CD) optical disk drive, whereafter CD media must in inserted or removed as necessary. Alternatively, bezel 85' is designed to conformally cover opening 74a in topcover 76 through which no mass storage media are to be passed, there being, for example, a fixed-head disk drive subassembly installed in the corresponding bay 27b. Although FIGS. 3 and 4 suggest that opening 74a is centrally located in front panel 74, it will be appreciated that one or more openings 74a may be equally well placed elsewhere on front panel 74. Pairs of hooks 86 and snaps 87 are employed to engage and secure either of bezels 85 or 85' to front side 74 of topcover 76, in the fashion of rear panel and topcover assemblies 46 and 78, as previously described. Thus configured, detachable, top cover assembly 78 comprises either bezel 85 or 85' mated to topcover 76.

Shielding to reduce frontally-emitted EMI from front panel 74 of topcover 76 is supplied as necessary by snapping one or more generally C-shaped front EMI shields 88 onto top and bottom rim portions 16 and 18 of front side 12 of base assembly 5. As shown in FIG. 4, front shields 88 consist of a vertically portion extending between two shorter, horizontal portions. The vertically extending portion of shield 88 has an opening in it or not, as appropriate, to match either bezel 85 or 85'. The upper and lower horizontal portions have one or more shield snaps 89 or tab-receiving openings (not shown) formed therein. Shields 88 are secured in position on front side 12 such that the shield snaps 89 and tab-receiving openings are mated to complimentary shield openings 89a and shield tabs 90 in top and bottom rim portions 16 and 18 of front side 12, respectively. As will be appreciated by those familiar with the art, shields 88 supplied and installed in the foregoing manner provide simplified installation and more solid electrical connection to base assembly 5, simplify formation, installation, and removal of topcover assembly 78.

Topcover assembly 78 is subsequently mounted to base assembly 5. First, assembly 78 is obliquely positioned against the bottom rim portion of front side 12 of chassis 10 such that tabs 80 on assembly 78 are engaged in tab-receiving openings 7 in chassis 10. Assembly 78 is thereafter rotated downward about a horizontal axis extending through tabs 80 until tabbed fingers 77a located at peripheral edges of shield 77 bear against top rim 16 of chassis 10, whereby topcover-mounting snaps 81 are received into topcover-mounting hooks 47 in rear panel assembly 46 mounted to base assembly 5. Gentle pressure may then be applied to topcover assembly 78 in the direction of rotation until snaps 81 are positively engaged to retain assembly 78 on base assembly 5. Alternatively, where ruggedness of design so dictates, a plurality of fasteners (not shown) such as Torx® high strength screws, may be employed.

Connecting a computer system to AC line power typically has been accomplished by providing a button or rocker type switch somewhere on a nonremovable exterior surface of such computer, which switch is then depressed or moved to turn the computer on or off as desired. In the present invention, it was desired to provide on/off switching functionality on the front panel 74 closest to the computer user. However, because topcover assembly 78 including front panel 74 is entirely removable from base assembly 5, a problem was encountered how to facilitate topcover removal at the same time as accommodating a switch on front panel 74. Obviously, such an exterior mounted switch would require one or more electrical wires extending from the switch to the switched device (e.g., a power supply), which wires would affect movement of topcover assembly 78 relative to the unit containing the switched device (base assembly 5). With reference to FIGS. 1, 3, 3a, and 4, the computer enclosure comprising the present invention overcomes the above problem by providing an on/off actuator 95 intended to operate an internal line power switch 96a on power supply 35 from a button 96 disposed on front panel 74. In accordance with the foregoing description, it is intended that actuator 95 be mounted in close proximity to front side 12 of chassis 10 prior to mounting tray 20 within chassis 10. With brief reference to FIG. 3a, button 96 is inserted through buttonhole 98 in front panel 74 and is retained in place by an appropriately formed button retainer 99 formed of spring steel, plastic, or other deflectable material. Actuator 95 is mounted to chassis 10 via one or more pairs of L-shaped tabs 97 formed in floor 11 of chassis 10, as shown in FIG. 1. L-shaped tabs 97 may, for example, be formed in the manner of openings 22 or 24 described above, and are formed so as to slideably retain a pair of rails 98 extending from lower edges of actuator 95. Actuator 95 is constrained in frontward and rearward directions by button 96 and the internal power line switch 96a within power supply 35. When thus installed, actuator 95 slides in a direction normal to front side 12 of chassis 10, as well as normal to front panel 74 when topcover assembly 78 is mounted to base assembly 5. When topcover assembly 78 is mounted to base assembly 5, no electrical connection need be made to button 96 because button 96 is not an electrically active component. Rather, topcover assembly 78 is simply mounted to base assembly 5 as described above, whereby actuator 95 bears against both button 96 and line switch 96a. Thereafter, a user may turn on or off the computer system by depressing button 96, thereby sliding actuator 95 rearward to depress line switch 96a.

Having described the construction of a modular computer enclosure according to the present invention, the benefits of such construction will now be briefly discussed. First, the modularity of the base assembly 5 permits a user or service technician to easily access, remove and replace any functional subsystem without need for substantial disassembly of the computer system. Rather, having removed the top cover assembly 78, any subassembly 60 can replaced substantially independently from any other subassembly. For example, a disk drive mass storage subassembly can be removed in the event of failure or upgrade without affecting any of the frontally mounted subassemblies (60). Second, a computer manufacturer assembling products in accordance with the above invention can more easily incorporate the latest system technologies, without requiring substantial modifications or refabrication of existing inventory of enclosures. Rather than having to dismantle an assembled system constructed according to the prior art, a manufacturer of products incorporating the present invention can simply remove the top cover assembly, remove the individual subassembly being updated, and reinstall the cover. For example, if main circuit board 50 undergoes a processor upgrade, a technician must only open the computer remove the existing circuit board, and install the new main circuit board 50 independent of disk drives, power supplies, or other subassemblies, thus saving time and costs. Further, the removable/interchangeable rear panel assembly 46 enables a manufacturer to reconfigure rear panel connector layouts in successive versions of its product, without requiring revision of the entire computer enclosure. This attribute may be especially helpful in facilitating rapid development of follow-on products based on the general system configuration, but requiring or using different connectors and connector layouts. Thirdly, users may more easily upgrade computer components, as for example, replacing main circuit board 50 with a newer board having a different connector configuration, whereby the altered connector configuration is accommodated by replacing the original back panel assembly 46 with a new appropriately formed assembly. And finally, because the product identity of computer enclosures constructed according to the present invention is substantially provided by the removable plastic topcover assembly 78, it is possible to significantly alter the outward appearance of such an enclosure by changing only the design of topcover assembly 78. In other words, the more complex enclosure components and subassemblies would remain unchanged while at the same time the exterior design is altered according to need or desire. Because plastic topcover assembly 78 can easily and inexpensively be made to incorporate cosmetic details and finish, total cost of an enclosure constructed according to the present invention is minimized compared to a similar cosmetic finish achieved with an all-steel enclosure.

The foregoing has described an arrangement for, and methods for assembling, a simple, light weight yet robust modular enclosure for a personal computer system comprising essentially four snapped together structural pieces. The enclosure is designed to receive all functional components and subassemblies necessary to the operation of a personal computer system without limiting access to any other subassembly. As a result, a personal computer system designed and assembled in accordance with the present invention can be easily and inexpensively reconfigured and updated by the manufacturer, retailer, or end user without need for time consuming disassembly and assembly operations. Although the foregoing has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

We claim:

1. In a personal computer system including a main processor board intercommunicating with at least one modular, internal peripheral subassembly, a computer enclosure comprising:
    a base assembly, further comprising:
        a chassis having a floor and first, second, third, and fourth sides, and having an interior region disposed therebetween; and
        a subassembly tray mounted to said chassis within said interior region, said subassembly tray comprising a plurality of bays, one of said bays removably receiving said modular, internal peripheral subassembly:
    a rear panel assembly detachably mounted to said base assembly, further comprising:
        a rear panel having a first arrangement of connector openings; and
        a rear EMI shield mounted to said rear panel, said rear EMI shield having a second arrangement of connector openings substantially similar to said first arrangement of connector openings; and,
    a topcover assembly detachably mounted to said base assembly, further comprising:
        a topcover having an integral front panel; and
        a top EMI shield mounted to said topcover.

2. The computer enclosure as set forth in claim 1 further comprising an electrically passive actuator member slideably coupled to said floor between an electrically passive button, disposed on said front panel of said topcover assembly, and an electrically active switch, disposed on one of said subassemblies within said interior region.

3. The computer enclosure as set forth in claim 1, wherein said chassis comprises an electrically conductive material and functions as a base EMI shield.

4. The computer enclosure as set forth in claim 1, wherein said computer enclosure has associated with it a product design factor including product identity which is substantially alterable by interchanging only said rear panel and topcover assemblies with a different rear panel assembly and a different topcover assembly while leaving said chassis substantially unaltered.

5. The computer enclosure as set forth in claim 4, wherein said topcover assembly and said different topcover assembly further comprise detachable front bezel panels.

6. In a personal computer system including a main processor board intercommunicating with at least one modular, internal peripheral subassembly, a computer enclosure comprising:
    a base assembly, further comprising:
        a chassis having a floor and front, left, right, and rear sides, and having an interior region disposed therebetween, and
        a subassembly tray mounted to said floor within said interior region, said subassembly tray comprising a plurality of bays, one of said bays removably receiving said modular, internal peripheral subassembly, said subassembly tray further comprising subassembly retaining means for securely retaining said subassemblies in each bay;
    a rear panel assembly detachably mounted to said rear side, comprising:
        a rear panel having a first arrangement of connector openings; and
        a rear EMI shield mounted to said rear panel, said rear EMI shield having a second arrangement of connector openings substantially similar to said first arrangement of connector openings;

a topcover assembly detachably mounted to said base assembly, comprising:
- a topcover comprising integral front, left, right and top panels, and
- a top EMI shield interiorly mounted to said top panel; and,
- an electrically passive actuator member slideably coupled to said floor between an electrically passive button, disposed on said front panel of said topcover assembly, and an electrically active switch, disposed on one of said subassemblies;

said topcover assembly, when mounted to said base assembly substantially enclosing said front, left, right, and rear sides and said interior region of said chassis.

7. The computer enclosure as set forth in claim 6, wherein said topcover assembly comprises a plurality of tab and snap members;
- said tab members removably positioned within a corresponding plurality of tab receiving openings disposed in said front side of said chassis;
- said snap members disposed on a rear portion of said top panel of said topcover and removably inserted into a corresponding plurality of snap receiving openings disposed in said rear panel assembly mounted to said base assembly.

8. The computer enclosure as set forth in claim 6, wherein said chassis comprises an electrically conductive material and functions as a base EMI shield.

9. The computer enclosure as set forth in claim 6, wherein said computer enclosure has associated with it a product design factor including product identity which is substantially alterable by interchanging only said rear panel and topcover assemblies with a different rear panel assembly and a different topcover assembly while leaving said chassis substantially unaltered.

10. The computer enclosure as set forth in claim 9, wherein said topcover assembly further comprises detachable front bezels.

11. In a personal computer system including a main processor board intercommunicating with at least one modular, internal peripheral subassembly, a computer enclosure comprising:
- a base assembly, further comprising:
  - a chassis having a floor and front, left, right, and rear sides, and having an interior region disposed therebetween, said floor having a first plurality of tab members disposed thereon, said left and right sides having a second plurality of tab members disposed thereon, said chassis comprising an electrically conductive material and functioning as a base EMI shield;
  - a first plurality of board guides disposed on said chassis to receive and locate a first edge of said main processor board;
  - a first plurality of panel hook openings disposed on said rear side,
  - a first plurality of panel snap openings disposed on said rear side,
  - a first plurality of tray snap openings disposed on said floor;
  - a first plurality of tray hook openings disposed on said floor; and,
  - a first plurality of topcover tab receiving openings disposed on said front side;
- a unitary, subassembly tray mounted to said base assembly, said subassembly tray further comprising:
  - a plurality of bays having subassembly retaining means for securely retaining said subassembly, said subassembly retaining means comprising at least one subassembly retaining snap having a latch head;
  - a first plurality of tray mounting snaps received into said first plurality of tray snap openings in said floor of said base assembly; and,
  - a first plurality of tray mounting hooks received into said first plurality of tray hook openings in said floor of said base assembly;
- a rear panel assembly detachably mounted to said rear side of said base assembly, said rear panel assembly further comprising:
  - a rear panel having a first arrangement of connector openings and a first interior surface having a first plurality of pin members disposed thereon; and
  - a rear EMI shield comprising a first plurality of shield mounting openings receiving and retaining said first plurality of pin members on said rear panel, said rear EMI shield further having a second arrangement of connector openings substantially similar to said first arrangement of connector openings on said rear panel;
  - a first plurality of panel mounting hooks removably received into said second plurality of hook receiving openings in said rear side of said chassis;
  - a first plurality of panel mounting snaps removably received into said second plurality of snap receiving openings in said rear side of said chassis; and,
  - a second plurality of board guides to receive and locate a second edge of said main processor board; and,
- a topcover assembly detachably mounted to said base assembly and said rear panel assembly, said topcover assembly further comprising:
  - integral front, left, right and top panels, said top panel having a second interior surface having a second plurality of pin members disposed thereon;
  - a top EMI shield comprising a second plurality of shield mounting openings receiving and retaining said second plurality of pin members on said top panel;
  - a plurality of cover mounting tab members disposed on said front panel; and,
  - a plurality of cover mounting snaps disposed on a rear portion of said top panel;
  - when said topcover assembly is mounted to said base assembly, said tab members are removably positioned within said tab receiving openings disposed in said front side of said chassis, said topcover mounting snaps are removably inserted into said snap receiving openings disposed in said rear panel assembly mounted to said base assembly, said topcover assembly thereby substantially enclosing said front, left, right, and rear sides and said interior region of said chassis.

12. The computer enclosure as set forth in claim 11 further comprising an electrically passive actuator member slideably coupled to said floor between an electrically passive button, disposed on said front panel of said topcover assembly, and an electrically active switch, disposed on one of said subassemblies within said interior region.

13. The computer enclosure as set forth in claim 11, wherein said computer enclosure has associated with it a product design factor including product identity which is substantially alterable by interchanging only said rear panel and topcover assemblies with a different rear panel assembly and a different topcover assembly while leaving said chassis substantially unaltered.

14. The computer enclosure as set forth in claim 13, wherein said topcover assembly further comprises detachable bezel panels.

15. In a personal computer system including a main processor board intercommunicating with at least one modular, internal peripheral subassembly, a method for assembling a computer enclosure comprising the steps of:
  providing a base assembly by forming a chassis of an electrically conductive material and functioning as a base EMI shield, said chassis having a floor and first, second, third, and fourth sides and an interior region disposed therebetween, and thereafter mounting a subassembly tray comprising a plurality of bays to said chassis within said interior region, one of said bays removably receiving said modular, internal peripheral subassembly;
  detachably mounting a rear panel assembly to said base assembly, said rear panel assembly comprising a rear panel having a first arrangement of connector openings, said rear panel assembly further comprising a rear EMI shield mounted to said rear panel and having a second arrangement of connector openings substantially similar to said first arrangement of connector openings; and
  detachably mounting to said base assembly a topcover assembly comprising:
    a topcover having an integral front panel, and
    a top EMI shield mounted to said topcover.

16. The method as set forth in claim 15 further comprising the step of slideably coupling an electrically passive actuator member to said floor between an electrically passive button, disposed on said front panel of said topcover assembly, and an electrically active switch, disposed on one of said subassemblies.

17. The method for assembling a computer enclosure as set forth in claim 15, further comprising the step of associating a product design factor with said computer enclosure, said product design factor including product identity which is substantially alterable by interchanging only said rear panel and topcover assemblies with a different rear panel assembly and a different topcover assembly while leaving said chassis substantially unaltered.

18. The method recited in claim 17 wherein the step of forming said topcover assembly further comprises the step of providing detachable bezel panels forming a portion of said integral front panel.

* * * * *